United States Patent
Scott et al.

(10) Patent No.: US 12,548,452 B2
(45) Date of Patent: Feb. 10, 2026

(54) SYSTEMS AND METHODS FOR MONITORING AVIATION NOTIFICATIONS

(71) Applicant: THE BOEING COMPANY, Arlington, VA (US)

(72) Inventors: Thomas Winston Scott, Denver, CO (US); Samantha Ann Schwartz, Castle Pines, CO (US); Jeffrey Lee Williams, Littleton, CO (US)

(73) Assignee: Jeppesen Foreflight, Inc., Englewood, CO (US)

( * ) Notice: Subject to any disclaimer, the term of this patent is extended or adjusted under 35 U.S.C. 154(b) by 154 days.

(21) Appl. No.: 18/522,431

(22) Filed: Nov. 29, 2023

(65) Prior Publication Data
US 2025/0174132 A1    May 29, 2025

(51) Int. Cl.
*G08G 5/21*    (2025.01)
*B64D 43/00*    (2006.01)
*G08G 5/20*    (2025.01)

(52) U.S. Cl.
CPC ............ *G08G 5/21* (2025.01); *B64D 43/00* (2013.01); *G08G 5/20* (2025.01)

(58) Field of Classification Search
None
See application file for complete search history.

(56) References Cited

U.S. PATENT DOCUMENTS

| | | | |
|---|---|---|---|
| 9,269,205 B1* | 2/2016 | Lamkin | G08G 5/55 |
| 2021/0343151 A1 | 11/2021 | Cornel | |
| 2023/0392954 A1* | 12/2023 | Rao | G08G 5/21 |

OTHER PUBLICATIONS

1 Extended European Search Report for EP 24212868.8-1009, dated Apr. 24, 2025.

* cited by examiner

*Primary Examiner* — Christian Chace
*Assistant Examiner* — Shayne M. Gilbertson
(74) *Attorney, Agent, or Firm* — Lathrop GPM LLP

(57) ABSTRACT

A system and a method include a user interface including a display and an input device. A control unit is in communication with the user interface. The control unit configured to present aviation data and an evaluation entry device on the display. The evaluation entry device is associated with the aviation data. The control unit is further configured to receive an evaluation of the aviation data input by a user via the evaluation entry device, determine an evaluation score for the aviation data based, at least in part, on the evaluation, and present the evaluation score for the aviation data on one or both of the display or one or more other displays of one or more other user interfaces. One or more aircraft are operated based on the evaluation score for the aviation data.

20 Claims, 4 Drawing Sheets

SYSTEMS AND METHODS FOR MONITORING AVIATION NOTIFICATIONS

FIELD OF THE DISCLOSURE

Examples of the present disclosure generally relate to systems and methods for monitoring aviation notifications for pilots of aircraft.

BACKGROUND OF THE DISCLOSURE

Aircraft are used to transport passengers and cargo between various locations. Numerous aircraft depart from and arrive at a typical airport every day.

Pilots typically receive information from numerous data sources before and during a flight. For example, pilots receive Notice to Air Missions (NOTAMs), airport notes, current weather conditions, airline-specific briefing content, and/or the like. As such, pilots sift through the information to determine what is uniquely relevant to a particular flight. However, the copious amount of information may prove difficult or impossible to fully analyze.

Hundreds of NOTAMs in briefing packages, hundreds of notes for a set of airport pages, large documents for an airline, and numerous sources of real-time airport weather data may make it difficult for a pilot to determine relevant information for a specific aircraft departing from or arriving at a specific airport and runway on a specific day. Typically, a pilot needs to proactively seek, discover, and synthesize important, relevant information from huge volumes of data.

SUMMARY OF THE DISCLOSURE

A need exists for a system and a method for determining relevant information regarding operation of an aircraft. Further, a need exists for a system and a method for presenting the relevant information to a pilot of the aircraft.

With those needs in mind, certain examples of the present disclosure provide a system including a user interface including a display and an input device. A control unit is in communication with the user interface. The control unit is configured to present aviation data and an evaluation entry device on the display. The evaluation entry device is associated with the aviation data. The control unit is further configured to receive an evaluation of the aviation data input by a user via the evaluation entry device, determine an evaluation score for the aviation data based, at least in part, on the evaluation, and present the evaluation score for the aviation data on one or both of the display or one or more other displays of one or more other user interfaces. One or more aircraft are operated based on the evaluation score for the aviation data.

The control unit can be remote from the one or more aircraft. As another example, the control unit can be onboard the one or more aircraft. The user interface can be onboard the one or more aircraft.

The aviation data can include a meteorological aerodrome report (METAR), a Notice to Air Mission (NOTAM), a Pilot Report (PIREP), or the like.

The system can also include one or more databases in communication with the control unit. The control unit is further configured to store the evaluation associated with the aviation data in the one or more databases. As an example, the one or more databases can include a public database and a private database.

In at least one example, the control unit is further configured to present a flag on the display. The flag is configured to be engaged to prioritize the data irrespective of the evaluation score.

The control unit can be further configured to automatically operate the one or more aircraft operated based on the evaluation scores for the aviation data.

The control unit can be an artificial intelligence or machine learning system. In at least one example, the control unit can be or otherwise include a deterministic or rules based evaluation system.

Certain examples of the present disclosure provide a method including presenting, by a control unit in communication with a user interface, aviation data and an evaluation entry device on a display of the user interface, wherein the evaluation entry device is associated with the aviation data; receiving, by the control unit, an evaluation of the aviation data input by a user via the evaluation entry device; determining, by the control unit, an evaluation score for the aviation data based, at least in part, on the evaluation; and presenting, by the control unit, the evaluation score for the aviation data on one or both of the display or one or more other displays of one or more other user interfaces, wherein one or more aircraft are operated based on the evaluation score for the aviation data.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
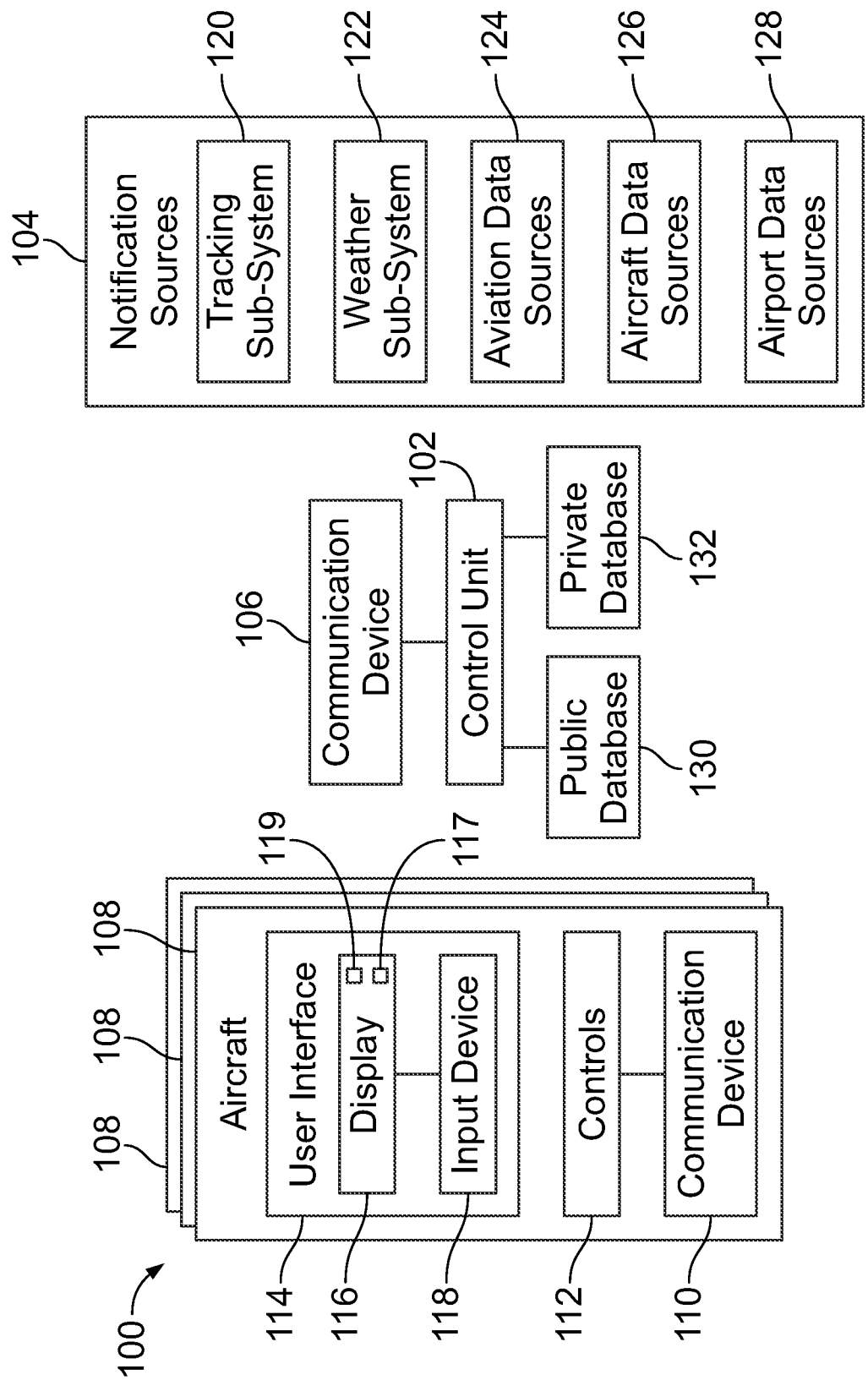
FIG. 1 illustrates a block diagram of a system, according to an example of the present disclosure.

FIG. 1 illustrates a block diagram of a system 100, according to an example of the present disclosure. The system 100 includes a control unit 102 in communication with a plurality of notification sources 104, such as through one or more wired or wireless connections. For example, the control unit 102 can be coupled to a communication device 106 that receives data from the notification sources 104. The communication device 106 can be one or more of an antenna, a transceiver, an internet connection, a cloud-based connection, and/or the like.

The control unit 102 is also in communication with one or more aircraft 108, such as via communication between the communication device 106 and a communication device 110 of the aircraft 108. The communication device 110 can be an antenna, a transceiver, an internet connection, a cloud-based connection, and/or the like. In at least one example, control unit 102 is separate and distinct from the aircraft 108. For example, the control unit 102 can be located at a central monitoring location, which can be remote from, or optionally co-located with, one or more of the notification sources 104. As another example, the control unit 102 can be onboard the aircraft 108, such as within a flight deck or cockpit. For example, the control unit 102 can be part of a flight computer of the aircraft 108.

The aircraft 108 includes controls 112 configured to allow an operator, such as a pilot, to control operation of the aircraft 108. For example, the controls 112 include one or more of a control handle, yoke, joystick, control surface controls, accelerators, decelerators, and/or the like.

The aircraft 108 also includes a user interface 114, such as within a flight deck or cockpit of the aircraft 108. The user interface 114 includes a display 116 and an input device 118. The display 116 can be a monitor, screen, television, touchscreen, and/or the like. The input device 118 can include a keyboard, mouse, stylus, touchscreen interface (that is, the input device 118 can be integral with the display 116), and/or the like. The user interface 114 can be, or part of, a computer workstation. For example, the user interface 114 can be part of the flight computer within the flight deck or cockpit of the aircraft 108. As another example, the user interface 114 can be a handheld device, such as a smart phone, tablet, or the like.

In at least one example, the control unit 102 can be in communication with a user interface 114 that is not onboard an aircraft 108, in addition to (or optionally instead of) the user interface 114 onboard one or more aircraft 108. For example, the user interface 114 can be at a land-based monitoring location, such as with respect to air traffic control, a flight dispatcher, an airline operations center, and/or the like.

In operation, the control unit 102 receives data (for example, aviation data) from the notification sources 104. The data includes vast amounts of information from numerous different notification sources 104. The notification sources 104 include a tracking sub-system 120, which is configured to track the aircraft 108. In at least one example, the tracking sub-system 120 is configured to track positions of the aircraft 108 in real time. In at least one example, the tracking sub-system 120 is a radar sub-system. As another example, the tracking sub-system is an automatic dependent surveillance-broadcast (ADS-B) tracking sub-system. Real time positions of the aircraft 108 on the ground and within an airspace are detected by the tracking sub-system 120 that receives position signals output by a position sensor of the aircraft 108. For example, the tracking sub-system 120 receives ADS-B signals output by the position sensors of the aircraft 108. As another example, the position sensor of the aircraft 108 can be global positioning system sensors. The position sensor outputs signals indicative of one or more of the position, altitude, heading, acceleration, velocity, and/or the like of the aircraft 108. The signals are received by the tracking sub-system 120.

The notification sources 104 also include a weather sub-system 122, which provides past, current, and predicted weather for locations of the aircraft 108, airports, and the like. As an example, the weather sub-system 122 can include a weather station, channel, or the like. As another example, the weather sub-system 122 can include aeronautical weather services that provide weather notifications at various locations, such as airports. An example of data from a weather sub-system 122 includes a meteorological aerodrome report (METAR).

The notification sources 104 also include aviation data sources 124, which provide information regarding aviation flight operations. Examples of the aviation data sources 124 includes NOTAMs, aircraft communication addressing and reporting system (ACARS), Digital Automatic Terminal Information Service (D-ATIS), Pilot Reports (PIREPs), and the like.

The notification sources 104 also include aircraft data sources 126, which provide information about various aircraft. For example, the aircraft data sources 126 include information regarding a type and capabilities of the aircraft 108. The aircraft data sources 126 can be information provided by a manufacturer, maintenance provider, operator, and/or the like of the aircraft 108.

The notification sources 104 also include airport data sources 128, which provide information regarding an airport, such as a departure airport and/or an arrival airport for the aircraft 108. The airport data sources 128 can include airport map data, including locations of runways, taxiways, gates, and the like.

In operation, the data from the notification sources 104 can be directly output to the user interfaces 114 of the aircraft 108, and user interfaces 114 which may not be onboard the aircraft 108. That is, the user interfaces 114 may directly receive data from the notification sources 104. As another example, the control unit 102 can receive the data from the notification sources 104, which may then output the notification sources 104 to the user interfaces 114. In short, one or more control units, such as the control unit 102 and/or another control unit in communication with the user interface(s) 114, receives the data from the notification sources 104, and presents the data on the display 116 for a user to view.

In response to receiving the data from the notification sources and presenting the data on the display 116, the control unit 102 provides an evaluation entry device 117 on the display 116. The evaluation entry device 117 is associated with the data being shown on the display 116. For example, the control unit 102 shows data, such as a NOTAM or PIREP, on the display 116, and the evaluation entry device 117 on the display 116 along with the data. In at least one example, the evaluation entry device 117 is a graphic, text, and/or the like that is shown on the display 116. For example, the evaluation entry device 117 can include a thumbs up icon and a thumbs down icon. As another example, the evaluation entry device 117 can include a + icon and a − icon. As another example, the evaluation entry device 117 can include a YES or NO button, such as shown on the display 116. As another example, the evaluation entry device 117 can include an APPROVE or DISAPPROVE button, such as shown the display 116.

In response to viewing the data on the display 116, a user (such as a pilot, dispatcher, or the like) can operate the evaluation entry device 117 to provide an evaluation of the data. In particular, if the user finds the data valuable or otherwise helpful, the user operates the evaluation entry device 117 to indicate approval of the data. For example, the user selects the thumbs up icon (such as via the input device 118) to up vote the data, thereby indicating that the user approves of the data as being helpful. Conversely, if the user does not find the data valuable or otherwise helpful, the user selects the thumbs down icon to down vote the data, thereby indicating the user does not approve of the data as being helpful.

In this manner, the user is able to determine whether received data from a notification source 104 is useful (such as helpful, valuable, relevant, and/or the like) for flight operations. The user votes on the data via the evaluation entry device 117 shown on the display 116. The control unit 102 receives the evaluation of the data (input via the evaluation entry device 117) from the user interface 114, and associates the evaluation with the data shown on the display 116. The control unit 102 then stores the evaluation of the data in one or more databases, such as a public database 130 or a private database 132, each of which can be in communication with the control unit 102 through one or more wired or wireless connections. The control unit 102 receives evaluations of the data from various user interfaces, and compiles such evaluations in one or both of the databases 130 and/or 132. In this manner, the control unit 102 is configured to store crowd sourced evaluations of the data, which are input through evaluation entry devices 117 of various user interfaces 114, such as onboard aircraft 108, at ground-based locations, and/or the like.

The private database 132 can be a database of a particular entity that does not wish stored data to be public. For example, an airline or aircraft operator can have a private database 132. The system 100 can include more than one private database 132. In contrast, the public database 130 can be a general database that stores public information. In at least one example, information from the private database 132 can be integrated into to the public database 130 (such as at the permission of the entity having the private database 132), but information from the public database 130 may not be integrated into the private database 132, as the private entity may only desire approved and authorized users to input desired information.

The control unit 102 can be in communication with the public database 130 and the private database 132. Optionally, the control unit 102 can store evaluations associated with data in a single database, such as the public database 130 or the private database 132. That is, the system 100 may optionally include only a single database, such as the public database 130 or the private database 132.

After compiling the evaluations of the data, the control unit 102 can then present (such as shown) evaluation results for the data based on the evaluations compiled and stored in the database(s), such as the public database 130 and/or the private database 132. In this manner, a user (such as a pilot of an aircraft 108) can readily and quickly determine whether data has been considered useful to other operators. The control unit 102 can present (such as show) on the display 116 a score of previously evaluated data based on prior evaluations of the data. As an example, if data (such as a NOTAM or PIREP) has been upvoted 50% of the time, and downvoted 50% of the time, the control unit 102 shows a score of 50 for the data on the display 116. As another example, if the data has been upvoted 80% of the time, and downvoted 20% of the time, the control unit 102 shows a score of 80 for the data on the display 116. As another example, if the data based been upvoted 20% of the time, and downvoted 80% of the time, the control unit 102 shows a score of 20 for the data on the display 116.

In at least one example, the control unit 102 can order received data from the notification sources on the display 116 based on evaluation scores. For example, the control unit 102 can list data with higher scores (for example, data that have higher levels of upvoted data) before data with lower scores. The scores can be shown proximate to the data, such as along a subject line of the data. The presentation of the data according to evaluation scores can be determined and selected by a user, for example.

As another example, the control unit 102 can prevent showing data having an evaluation score that is below a predetermined threshold, which can be automatically selected by the control unit 102, and/or pre-selected by a user. For example, the control unit 102 can refrain from showing data having an evaluation score less than 20 (for example, data that has been upvoted only 20% of the time). Optionally, the threshold for presentation of data can be greater than 20 (such as 30 or 40), or less than 20 (such as 5 or 10).

The control unit 102 receives evaluations for the data presented on the display 116, and continually updates the evaluations for the data as stored in the database(s) 130 and/or 132. For example, the control unit 102 presents the data and associated evaluation score on the display 116. The user can then operate the evaluation entry device 117 on the display 116 to provide an evaluation of the data, which the control unit 102 then receives, and updates the evaluation score for the data based on the evaluation. In this manner, the evaluation scores associated with the data can be continually updated based on current and future evaluations.

As described herein, in at least one example, the system 100 includes the control unit 102 which presents data (for example, data associated with aviation operations, or aviation data) on the display 116, as well as the evaluation entry device 117, which allows a user to enter an evaluation of the data. The control unit 102 receives the evaluation of the data, and compiles the evaluation along with other evaluations of the data in one or more databases, such as the public database 130 and/or the private database 132. The control unit 102 can then show evaluation information (such as an evaluation score) for the data on the display 116. The evaluation information allows an operator to quickly and easily assess the usefulness (such as relevancy, helpfulness, importance, and/or the like) of the data. The system 100 allows for evaluations (for example, user opinions) of aviation data to be crowd sourced.

In at least one example, the control unit 102 can also present a flag 119 on the display 116. The flag 119 is associated with the data shown on the display 116. A user may engage the flag, such as via the input device 118, to prioritize particular data irrespective of an evaluation score. For example, certain aircraft operators may find certain data more relevant than other aircraft operators. When a user activates the flag 119, the control unit 102 receives a flagged indication, which can be associated with the data and stored in the private database 132. In this manner, the control unit 102 can then present the flagged data on the display 116 to select operators. The flagged data can be presented before other data, for example. For example, the control unit 102 presents data on the display 116 which is ordered based on evaluation scores. However, the control unit 102 may present the flagged data before other data regardless of evaluation scores. Optionally, the control unit 102 may not present the flag, nor prioritize flagged data.

In at least one example, the aircraft 108 is operated, such as on the ground at an airport or in the air, based on evaluated data, as shown on the display 116 the control unit 102. For example, a pilot views the evaluated data, and operates the aircraft 108 according to the relevant information.

In at least one example, the control unit 102 can also be in communication with the controls 112 of the aircraft 108, and configured to automatically operate the controls 112, based on the evaluated. As an example, the control unit 102 can automatically operate the aircraft 108 to avoid inclement weather as indicated in a METAR. As another example, the control unit 102 can automatically operate the aircraft 108 to avoid restricted airspace, such as set forth in a NOTAM. As another example, the control unit 102 can automatically operate the aircraft 108 to reduce airspeed in order to reduce time in a holding pattern (such as noted in a NOTAM) at a destination airport. Optionally, the control unit 102 may not be in communication with the controls 112, and may not be configured to automatically operate the aircraft 108.

As described herein, the system 100 including the control unit 102 allows for feedback and crowd-sourcing in relation to individual pieces of aviation information, and presents an assessment of such aviation information to users, such as pilots, dispatchers, air traffic controllers, and/or the like.

Each portion of data (such as a NOTAM, PIREP, METAR, or the like) is assessed and presented. An operator can opt for the control unit 102 to present the assessed data (that is, data evaluated by one or more users) based on a default macro level sorting as set by an operator (such as an airline. Optionally, the control unit 102 can present the assessed data according to a default macro level, but sub-sort via the votes. For example, the control unit 102 can first list closed runways before open runways, and then sort the closed runways based on evaluations. As another example, the control unit 102 can present the assessed data by following the evaluations, and ignoring macro level sorting rules. As another example, the control unit 102 can present the assessed data by following the default macro level sorting as set by an operator until a certain number of evaluations have been input by users, and then ignore the macro level sorting rules and follow the evaluations.

As described herein, the system 100 includes a user interface 114 including a display 116 and an input device 118. The control unit 102 is in communication with the user interface 114. The control unit 102 is configured to present aviation data and an evaluation entry device 117 on the display 116. The evaluation entry device 117 is associated with the aviation data. That is, the evaluation entry device 117 is configured to allow a user to input an evaluation regarding the aviation data. The control unit 102 is further configured to receive an evaluation of the aviation data input by a user via the evaluation entry device 117. The control unit 102 is further configured to determine an evaluation score for the aviation data based, at least in part, on the evaluation, and present the evaluation score for the aviation data on one or both of the display 116 or one or more other displays 116 of one or more other user interfaces 114. One or more aircraft 108 are operated based on the evaluation scores for the aviation data.

Figure 2:
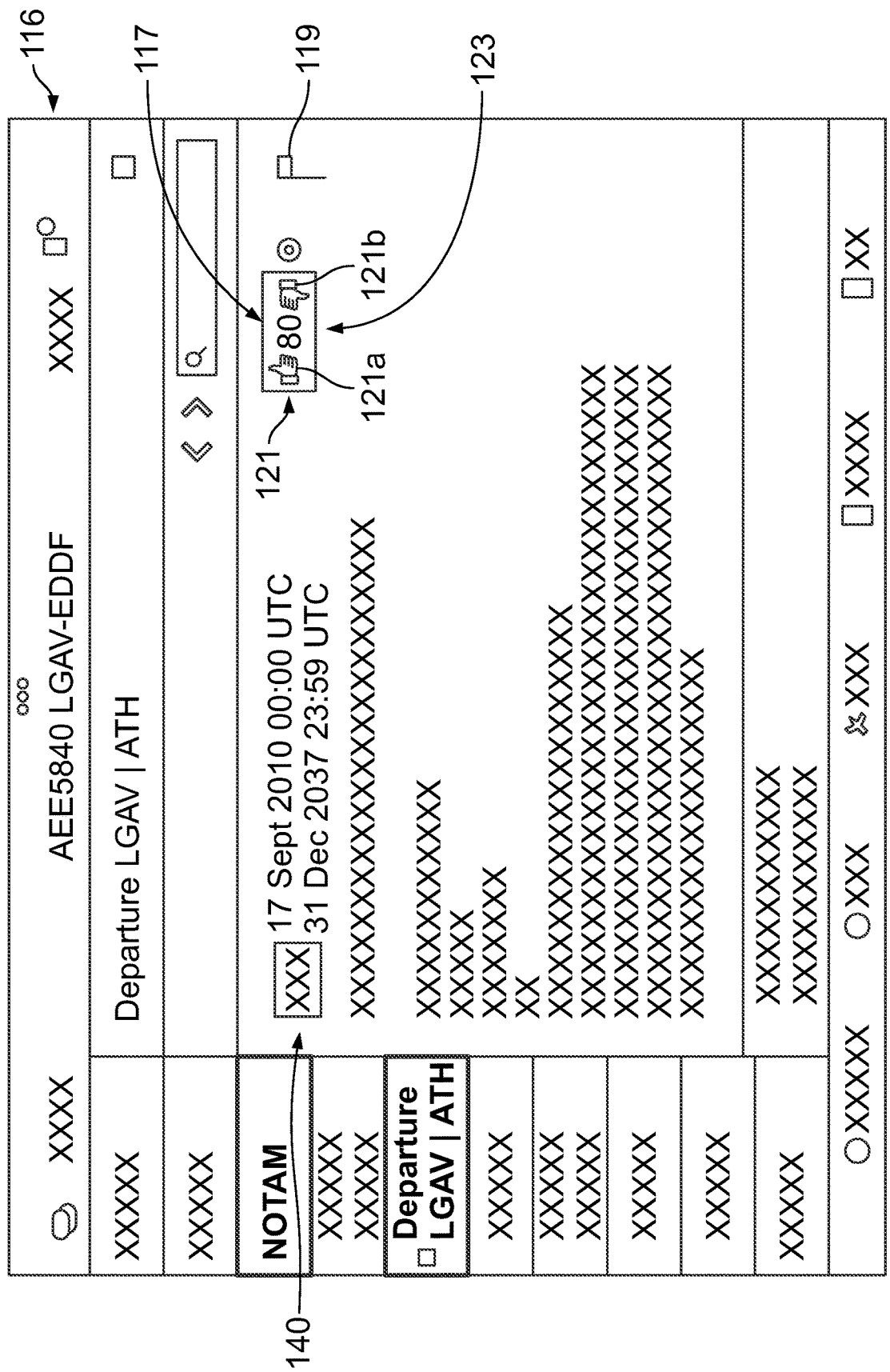
FIG. 2 illustrates a front view of a display, according to an example of the present disclosure.

FIG. 2 illustrates a front view of a display 116, according to an example of the present disclosure. Referring to FIGS. 1 and 2, the display 116 is part of a user interface 114, such as can be onboard an aircraft 108, at a ground-based station, and/or the like. The control unit 102 shows data, such as aviation data 140, on the display 116. As an example, the aviation data 140 is a NOTAM. The control unit 102 also shows an evaluation entry device 117 on the display 116. The evaluation entry device 117 is associated with the aviation data 140 shown on the display 116. The evaluation entry device 117 includes an engagement icon 121, such as a thumbs up 121a and thumbs down 121b, which allows a user to input an evaluation of the data. The control unit 102 also shows an evaluation score 123 on the display 116. The evaluation score 123 represents a complied evaluation for the data, as stored in one or more databases, such as the public database 130 and/or the private database 132. The evaluation score 123 can be shown on or within the evaluation entry device 117, such as between the thumbs up 121a and the thumbs down 121b.

Figure 3:
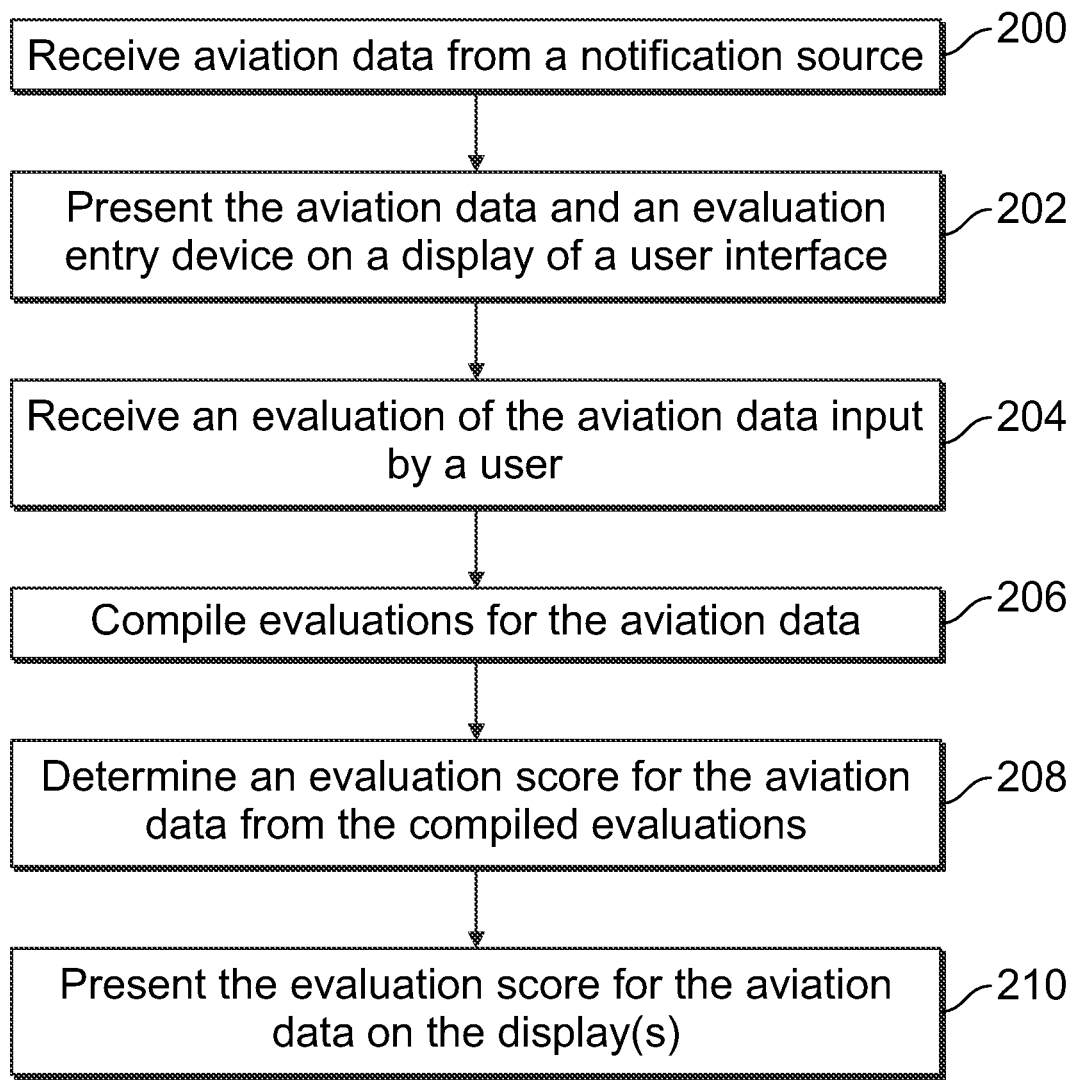
FIG. 3 illustrates a flow chart of a method, according to an example of the present disclosure.

FIG. 3 illustrates a flow chart of a method, according to an example of the present disclosure. Referring to FIGS. 1-3, at 200, data is received from a notification source 104. The data may be received by a user interface 114, and/or the control unit 102. At 202, the control unit 102 then presents (for example, shows, such as via text and/or graphics) the data and an associated evaluation entry device 117 on a display 116 of the user interface 114. The evaluation entry device 117 is configured to be engaged by an individual to allow for entry of an evaluation of the data, as determined by the user.

At 204, the control unit 102 receives an evaluation of the data, as input by a user through the evaluation entry device 117. At 206, the control unit 102 compiles evaluations (as input through multiple users through various user interfaces 114) for the data, and stores the evaluations associated with the data in one or more databases. At 208, the control unit 102 then determines an evaluation scores for the data from the complied evaluations. At 210, the control unit 102 presents the evaluation score for the data on one or more displays 116 of one or more user interfaces 114.

Figure 4:
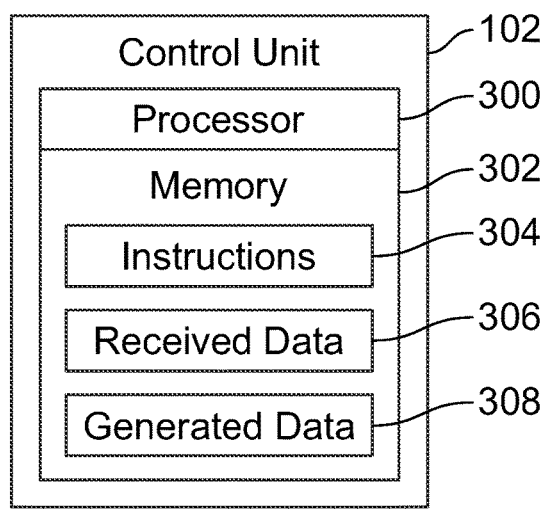
FIG. 4 illustrates a schematic block diagram of a control unit, according to an example of the present disclosure.

FIG. 4 illustrates a schematic block diagram of the control unit 102, according to an example of the present disclosure. In at least one example, the control unit 102 includes at least one processor 300 in communication with a memory 302. The memory 302 stores instructions 304, received data 306, and generated data 308. The control unit 102 shown in FIG. 4 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 102 may be or include one or more processors that are configured to control operation, as described herein.

The control unit 102 is configured to execute a set of instructions that are stored in one or more data storage units or elements (such as one or more memories), in order to process data. For example, the control unit 102 may include or be coupled to one or more memories. The data storage units may also store data or other information as desired or needed. The data storage units may be in the form of an information source or a physical memory element within a processing machine.

The set of instructions may include various commands that instruct the control unit 102 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 102. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 102 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-4, examples of the subject disclosure provide systems and methods that allow large amounts of data to be quickly and efficiently analyzed by a computing device. For example, the control unit 102 can receive and analyze data evaluations from hundreds, thousands, or more user interfaces 114 over days, weeks, months, or years. As such, large amounts of data, which may not be readily discernable by human beings, are being tracked and analyzed. The vast amounts of data are efficiently organized and/or analyzed by the control unit 102, as described herein. The control unit 102 analyzes the data in a relatively short time in order to quickly and efficiently compile relevant information for a pilot to consider during operation of the aircraft 108. As such, examples of the present disclosure provide increased and efficient functionality, and vastly superior performance in relation to a human being reviewing the vast amounts of data.

In at least one example, components of the system 100, such as the control unit 102, provide and/or enable a computer system to operate as a special computer system for determining and presenting relevant information to a pilot. The control unit 102 improves upon standard computing devices by determining such information and automatically communicating with pilots in an efficient and effective manner.

In at least one example, all or part of the systems and methods described herein are or otherwise include an artificial intelligence (AI) or machine-learning system that can automatically perform the operations of the methods also described herein. In at least one example, the control unit 102 can be or otherwise include a deterministic or rules based evaluation system. In at least one example, the control unit 102 can be an artificial intelligence or machine learning system. These types of systems may be trained from outside information and/or self-trained to repeatedly improve the accuracy with how data is analyzed to determine and present the relevant information to users, such as pilots and dispatchers. For example, an AI control unit 102 can be trained to learn relevancy thresholds for presenting certain types of data (based on evaluation scores) to one or more users, depending on particular habits and preferences of the user(s). Over time, these systems can improve by determining and communicating with increasing accuracy and speed, thereby significantly reducing the likelihood of any potential errors. For example, the AI or machine-learning systems can learn and determine models, associate such models with received data, and determine potential conflicts. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determinations and communications described herein. The training minimizes conflicts and interference by performing an iterative training algorithm, in which the systems are retrained with an updated set of data, and based on the feedback examined prior to the most recent training of the systems. This provides a robust analysis model that can better determine and present relevant information to a pilot.

Figure 5:
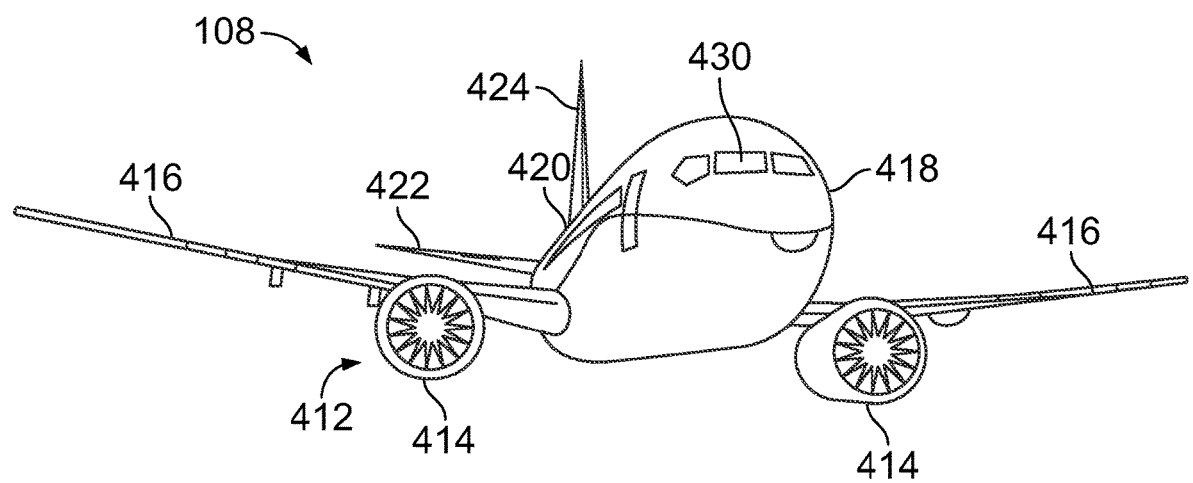
FIG. 5 illustrates a perspective front view of an aircraft, according to an example of the present disclosure.

FIG. 5 illustrates a perspective front view of an aircraft 108, according to an example of the present disclosure. The aircraft 108 includes a propulsion system 412 that includes engines 414, for example. Optionally, the propulsion system 412 may include more engines 414 than shown. The engines 414 are carried by wings 416 of the aircraft 108. In other examples, the engines 414 may be carried by a fuselage 418 and/or an empennage 420. The empennage 420 may also support horizontal stabilizers 422 and a vertical stabilizer 424. The fuselage 418 of the aircraft 108 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 5 shows an example of an aircraft 108. It is to be understood that the aircraft 108 can be sized, shaped, and configured differently than shown in FIG. 5.

Further, the disclosure comprises examples according to the following clauses:

Clause 1. A system comprising:
a user interface including a display and an input device; and
a control unit in communication with the user interface, the control unit configured to:
present aviation data and an evaluation entry device on the display, wherein the evaluation entry device is associated with the aviation data,
receive an evaluation of the aviation data input by a user via the evaluation entry device,
determine an evaluation score for the aviation data based, at least in part, on the evaluation, and present the evaluation score for the aviation data on one or both of the display or one or more other displays of one or more other user interfaces, wherein one or more aircraft are operated based on the evaluation score for the aviation data.

Clause 2. The system of Clause 1, wherein the control unit is remote from the one or more aircraft.

Clause 3. The system of Clause 1, wherein the control unit is onboard the one or more aircraft.

Clause 4. The system of any of Clauses 1-3, wherein the user interface is onboard the one or more aircraft.

Clause 5. The system of any of clauses 1-4, wherein the aviation data comprises a meteorological aerodrome report (METAR), a Notice to Air Mission (NOTAM), or a Pilot Report (PIREP).

Clause 6. The system of any of Clauses 1-5, further comprising one or more databases in communication with the control unit, wherein the control unit is further configured to store the evaluation associated with the aviation data in the one or more databases.

Clause 7. The system of Clause 6, wherein the one or more databases comprise a public database and a private database.

Clause 8. The system of any of Clauses 1-7, wherein the control unit is further configured to present a flag on the display, wherein the flag is configured to be engaged to prioritize the data irrespective of the evaluation score.

Clause 9. The system of any of Clauses 1-8, wherein the control unit is further configured to automatically operate the one or more aircraft operated based on the evaluation scores for the aviation data.

Clause 10. The system of any of Clauses 1-9, wherein the control unit is an artificial intelligence or machine learning system.

Clause 11. A method comprising:

presenting, by a control unit in communication with a user interface, aviation data and an evaluation entry device on a display of the user interface, wherein the evaluation entry device is associated with the aviation data;

receiving, by the control unit, an evaluation of the aviation data input by a user via the evaluation entry device;

determining, by the control unit, an evaluation score for the aviation data based, at least in part, on the evaluation; and presenting, by the control unit, the evaluation score for the aviation data on one or both of the display or one or more other displays of one or more other user interfaces, wherein one or more aircraft are operated based on the evaluation score for the aviation data.

Clause 12. The method of Clause 11, wherein the control unit is remote from the one or more aircraft.

Clause 13. The method of Clause 11, wherein the user interface is onboard the one or more aircraft.

Clause 14. The method of any of Clauses 11-13, wherein the aviation data comprises a meteorological aerodrome report (METAR), a Notice to Air Mission (NOTAM), or a Pilot Report (PIREP).

Clause 15. The method of any of Clauses 11-14, further storing, by the control unit, the evaluation associated with the aviation data in the one or more databases.

Clause 16. The method of Clause 15, wherein the one or more databases comprise a public database and a private database.

Clause 17. The method of any of Clauses 11-16, further comprising presenting, by the control unit, a flag on the display, wherein the flag is configured to be engaged to prioritize the data irrespective of the evaluation score.

Clause 18. The method of any of Clauses 11-17, further comprising automatically operating, by the control unit, the one or more aircraft operated based on the evaluation scores for the aviation data.

Clause 19. The method of any of Clauses 11-18, wherein the control unit is an artificial intelligence or machine learning system.

Clause 20. A non-transitory computer-readable storage medium comprising executable instructions that, in response to execution, cause one or more control units comprising a processor, to perform operations comprising:

presenting aviation data and an evaluation entry device on a display of a user interface, wherein the evaluation entry device is associated with the aviation data;

receiving an evaluation of the aviation data input by a user via the evaluation entry device;

determining an evaluation score for the aviation data based, at least in part, on the evaluation; and presenting the evaluation score for the aviation data on one or both of the display or one or more other displays of one or more other user interfaces, wherein one or more aircraft are operated based on the evaluation score for the aviation data.

As described herein, examples of the present disclosure provide systems and methods for determining relevant information regarding operation of an aircraft. Further, examples of the present disclosure provide systems and methods for presenting the relevant information to a pilot of the aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
one or more displays; and
a control unit in communication with the one or more displays, the control unit configured to:
present aviation data and an evaluation entry device on the one or more displays, wherein the evaluation entry device is associated with the aviation data,
receive an evaluation of the aviation data input by a user via the evaluation entry device,
determine an evaluation score for the aviation data based, at least in part, on the evaluation,
present the evaluation score for the aviation data on the one or more displays, and
present a flag on the one or more displays, wherein the flag is configured to be engaged to prioritize the aviation data irrespective of the evaluation score.

2. The system of claim 1, wherein the control unit is remote from the one or more aircraft.

3. The system of claim 1, wherein the control unit is onboard the one or more aircraft.

4. The system of claim 1, wherein the one or more displays are onboard the one or more aircraft.

5. The system of claim 1, wherein the aviation data comprises a meteorological aerodrome report (METAR), a Notice to Air Mission (NOTAM), or a Pilot Report (PIREP).

6. The system of claim 1, further comprising one or more databases in communication with the control unit, wherein the control unit is further configured to store the evaluation associated with the aviation data in the one or more databases.

7. The system of claim 6, wherein the one or more databases comprise a public database and a private database.

8. The system of claim 1, wherein the control unit is further configured to automatically operate the one or more aircraft operated based on the evaluation score for the aviation data.

9. The system of claim 1, wherein the control unit is an artificial intelligence or machine learning system.

10. A method comprising:
presenting, by a control unit in communication with one or more displays, aviation data and an evaluation entry device on the one or more displays, wherein the evaluation entry device is associated with the aviation data;
receiving, by the control unit, an evaluation of the aviation data input by a user via the evaluation entry device;
determining, by the control unit, an evaluation score for the aviation data based, at least in part, on the evaluation;
presenting, by the control unit, the evaluation score for the aviation data on the one or more displays; and
presenting, by the control unit, a flag on the one or more displays, wherein the flag is configured to be engaged to prioritize the aviation data irrespective of the evaluation score.

11. The method of claim 10, wherein the control unit is remote from the one or more aircraft.

12. The method of claim 10, wherein the one or more displays are onboard the one or more aircraft.

13. The method of claim 10, wherein the aviation data comprises a meteorological aerodrome report (METAR), a Notice to Air Mission (NOTAM), or a Pilot Report (PIREP).

14. The method of claim 10, further storing, by the control unit, the evaluation associated with the aviation data in one or more databases.

15. The method of claim 14, wherein the one or more databases comprise a public database and a private database.

16. The method of claim 10, further comprising automatically operating, by the control unit, the one or more aircraft operated based on the evaluation score for the aviation data.

17. The method of claim 10, wherein the control unit is an artificial intelligence or machine learning system.

18. A non-transitory computer-readable storage medium comprising executable instructions that, in response to execution, cause one or more control units comprising a processor, to perform operations comprising:
presenting aviation data and an evaluation entry device on one or more displays, wherein the evaluation entry device is associated with the aviation data;
receiving an evaluation of the aviation data input by a user via the evaluation entry device;
determining an evaluation score for the aviation data based, at least in part, on the evaluation;
presenting the evaluation score for the aviation data on the one or more displays; and
presenting, by the control unit, a flag on the one or more displays, wherein the flag is configured to be engaged to prioritize the aviation data irrespective of the evaluation score,
wherein one or more aircraft are operated based on the evaluation score for the aviation data.

19. The system of claim 1, wherein one or more aircraft are operated based on the evaluation score for the aviation data.

20. The method of claim 10, wherein one or more aircraft are operated based on the evaluation score for the aviation data.

* * * * *